United States Patent
Davidson et al.

(10) Patent No.: US 12,217,293 B2
(45) Date of Patent: Feb. 4, 2025

(54) METHODS AND APPARATUS FOR MERCHANDISE GENERATION INCLUDING AN IMAGE

(71) Applicant: Yearbooker, Inc., Vernon, NJ (US)

(72) Inventors: Robert Davidson, Vernon, NJ (US); Fanny Chung Davidson, Vernon, NJ (US)

(73) Assignee: Yearbooker, Inc., NJ (US)

( * ) Notice: Subject to any disclaimer, the term of this patent is extended or adjusted under 35 U.S.C. 154(b) by 345 days.

(21) Appl. No.: 17/728,028

(22) Filed: Apr. 25, 2022

(65) Prior Publication Data

US 2022/0245696 A1    Aug. 4, 2022

Related U.S. Application Data

(60) Continuation-in-part of application No. 16/724,615, filed on Dec. 23, 2019, now abandoned, which is a division of application No. 16/256,693, filed on Jan. 24, 2019, now Pat. No. 10,552,886, which is a continuation of application No. 16/102,219, filed on Aug. 13, 2018, now abandoned, which is a continuation of application No. 15/484,954, filed on Apr. 11, 2017, now Pat. No. 10,713,219.

(60) Provisional application No. 62/544,785, filed on Aug. 12, 2017, provisional application No. 62/320,663, filed on Apr. 11, 2016.

(51) Int. Cl.
| | |
|---|---|
| *G06Q 30/0601* | (2023.01) |
| *G06F 3/0482* | (2013.01) |
| *G06F 3/0486* | (2013.01) |
| *G06F 3/0488* | (2022.01) |
| *H04L 67/10* | (2022.01) |

(52) U.S. Cl.
CPC ....... *G06Q 30/0621* (2013.01); *G06F 3/0482* (2013.01); *G06F 3/0486* (2013.01); *G06F 3/0488* (2013.01); *H04L 67/10* (2013.01)

(58) Field of Classification Search
CPC .... G06F 3/0482; G06F 3/0486; G06F 3/0488; G06F 3/04845; G06Q 30/0621; H04L 67/10
See application file for complete search history.

(56) References Cited

U.S. PATENT DOCUMENTS

| | | |
|---|---|---|
| 6,111,586 A | 8/2000 | Ikeda et al. |
| 6,738,154 B1 | 5/2004 | Venable |
| (Continued) | | |

FOREIGN PATENT DOCUMENTS

WO    2013033664 A2    3/2013

OTHER PUBLICATIONS

"How to add the temperature on Instragram", accessed on Jan. 31, 2020, accessed from , 1-3 (Year: 2020).

*Primary Examiner* — Nicholas Klicos
(74) *Attorney, Agent, or Firm* — Joseph P. Kincart; Tracnik Law, PLLC (57) ABSTRACT

Methods and an apparatus for creation of physical articles of merchandise and associated virtual articles of merchandise based on a user selection of an image, such as a photo. A non-fungible token (NFT) may be associated with one or both of a physical article of merchandise and virtual article of merchandise, or associated with the image selected by the user. The NFT may be transferred with one or both of physical article of merchandise and virtual article of merchandise.

20 Claims, 8 Drawing Sheets

(56) References Cited

U.S. PATENT DOCUMENTS

| | | |
|---|---|---|
| 8,862,995 B1 | 10/2014 | Kuhne et al. |
| 9,030,496 B1 | 5/2015 | Davidson et al. |
| 11,374,756 B1* | 6/2022 | Myers .................... H04L 9/3213 |
| 2002/0122067 A1 | 9/2002 | Geigel et al. |
| 2003/0063304 A1* | 4/2003 | Satomi .................... G06F 21/10 |
| | | 358/1.11 |
| 2005/0030315 A1 | 2/2005 | Cohen et al. |
| 2005/0134939 A1 | 6/2005 | Ikeda et al. |
| 2006/0047547 A1 | 3/2006 | Ekker et al. |
| 2007/0162971 A1 | 7/2007 | Blom et al. |
| 2008/0088646 A1 | 4/2008 | Sako et al. |
| 2008/0222560 A1* | 9/2008 | Harrison ............. G06F 3/04847 |
| | | 715/788 |
| 2010/0026698 A1 | 2/2010 | Reville et al. |
| 2010/0070572 A1 | 3/2010 | Olson et al. |
| 2010/0287065 A1 | 11/2010 | Alivandi |
| 2011/0148916 A1 | 6/2011 | Blattner |
| 2012/0179571 A1 | 7/2012 | Grosso |
| 2012/0233253 A1 | 9/2012 | Ricci |
| 2012/0239528 A1 | 9/2012 | Nakagawa |
| 2012/0269380 A1 | 10/2012 | Crookham et al. |
| 2012/0278391 A1 | 11/2012 | Olson et al. |
| 2012/0331371 A1 | 12/2012 | Larson et al. |
| 2013/0080897 A1 | 3/2013 | Han et al. |
| 2013/0198602 A1 | 8/2013 | Kokemohr |
| 2014/0080456 A1 | 3/2014 | Nunn et al. |
| 2014/0088750 A1 | 3/2014 | Sharma et al. |
| 2014/0181715 A1 | 6/2014 | Axelrod et al. |
| 2014/0285402 A1 | 9/2014 | Rahman et al. |
| 2015/0143256 A1 | 5/2015 | Panchawagh-Jain et al. |
| 2015/0242706 A1 | 8/2015 | Brown |
| 2016/0139761 A1 | 5/2016 | Grosz et al. |
| 2017/0289234 A1 | 10/2017 | Andreou et al. |
| 2018/0350144 A1 | 12/2018 | Rathod |
| 2019/0102060 A1* | 4/2019 | Ishida .................... G06F 3/0483 |
| 2020/0074521 A1* | 3/2020 | Newbury ............. G06F 16/2379 |
| 2022/0294630 A1* | 9/2022 | Collen .................. H04L 9/3213 |
| 2023/0079195 A1* | 3/2023 | Matheson .......... G06Q 20/0655 |
| | | 705/44 |
| 2023/0080808 A1* | 3/2023 | Padmanabhan ...... G06Q 20/405 |
| | | 705/64 |

\* cited by examiner

FIG. 1A

Tap & Hold Photo

METHODS AND APPARATUS FOR MERCHANDISE GENERATION INCLUDING AN IMAGE

CROSS-REFERENCE TO RELATED APPLICATIONS

The present application claims priority as a continuation in part patent application to U.S. patent application Ser. No. 16/724,615 filed on Dec. 23, 2019 and entitled METHODS AND APPARATUS FOR MERCHANDISE GENERATION INCLUDING AN IMAGE; and also claims priority as a divisional application to the U.S. patent application Ser. No. 16/256,693 filed on Jan. 24, 2019 and entitled METHODS AND APPARATUS FOR MERCHANDISE GENERATION INCLUDING AN IMAGE which in turn claimed priority to Provisional Patent Application No. 62/621,357, filed on Jan. 24, 2018 and entitled METHODS AND APPARATUS FOR MERCHANDISE GENERATION INCLUDING AN IMAGE; and claims priority as a Continuation in Part application to U.S. patent application Ser. No. 15/484,954, entitled Methods and Apparatus for Dynamic Image Entries filed Apr. 11, 2017, which in turn claims the benefit of U.S. Provisional Patent Application Ser. No. 62/320,663 entitled Methods and Apparatus for Interactive Memory Book with Motion Based Annotations filed Apr. 11, 2016. The U.S. patent application Ser. No. 15/484,954 claims priority as a Continuation in Part application to U.S. patent application Ser. No. 14/535,270 entitled Methods for and Apparatus for Interactive School Yearbook now U.S. Pat. No. 9,030,496 issued May 12, 2015; which in turn claims the benefit of U.S. Provisional Patent Application Ser. No. 62/012,386 entitled Methods for and Apparatus for Interactive School Yearbook filed Jun. 15, 2014; and also claims the benefit of U.S. Provisional Patent Application Ser. No. 61/971,493 entitled Methods for and Apparatus for Interactive School Yearbook filed Mar. 27, 2014; and also claims the benefit of U.S. Provisional Patent Application Ser. No. 61/901,042 entitled Methods for and Apparatus for Interactive School Yearbook filed Nov. 7, 2013. The contents of these patent applications are relied upon and incorporated herein by reference.

This application cross-references and incorporates by reference the disclosure found in application Ser. No. 15/099,841.

FIELD OF THE DISCLOSURE

The present disclosure relates to methods and an apparatus for quickly and easily creating customized merchandise items, such as t-shirts, photo reprints, photo books, mugs, and calendars, based on static images.

BACKGROUND OF THE DISCLOSURE

Today's world increasingly includes assets and experiences in a physical world and a virtual world. Often uses seek to create and transact in both worlds. Websites allowing a user to generate merchandise, such as t-shirts, mugs, and calendars, from certain images have existed for many years. However, today, market participants seek to coordinate such merchandise in real world and virtual worlds. Sometimes, a user must either select an image from a pre-populated list of images the website owner has the rights to use, or upload his own and then keep track of rights in both virtual and physical environments.

The user seeking to create merchandise based off his own image must go through several time-consuming steps, such as locating the desired image, ensuring he has the rights to create merchandise based off the image, editing the image to meet his needs, finding a website that creates the specific type of merchandise he wants, and uploading the image to the website.

User uploads pose a potential legal problem for the website owner as well. For example, if the user chooses the a trademarked logo as a desired image and begins selling the trademarked item on merchandise, such as a t-shirt from the website, then the website could be liable for contributory trademark infringement in a real world and meta world. Additionally, if the user uploads a picture of someone else's child, that child's parents may be able to sue the website owner for misappropriating their child's likeness.

SUMMARY OF THE DISCLOSURE

Accordingly, the present invention provides apparatus and methods for generating a physical article of merchandise in the physical world and virtual article of merchandise in a virtual or meta world, the apparatus including a computer server for post processing the digital image data, the computer server in logical communication with an image capture device and accessible with a network access device via a digital communications network.

Embodiments may also include executable software stored on the computer server and executable on demand, the software operative with the servers to cause the apparatus to receive digital image data from the image capture device, the digital image data representative of one or more digital photos, such as a first photo and a second photo. A user may provide an input to the server choosing a desired article of merchandise, and the first digital photo to be applied to the article of merchandise. Embodiments may also include associate Cartesian Coordinates with specified segregated spatial areas of the first digital photo received from the image capture device and designating an area to apply the first digital photo to the article of merchandise.

Embodiments may also include receive a second digital photo and prompt the first user to designate desired Cartesian Coordinates on the article of merchandise. In some embodiments, to apply the first digital photo and the second digital photo. Embodiments may also include manufacture the article of merchandise in the physical world ("physical merchandise"), the physical merchandise including a replication of the first digital photo and the second digital photo.

Embodiments may also include generate a virtual article of merchandise in the virtual world ("virtual merchandise"), the virtual merchandise including a virtual replication of the first digital photo and the second digital photo. Embodiments may also include generate a non-fungible token ("NFT") for the virtual merchandise. Embodiments may also include transfer the physical merchandise to the first user. Embodiments may also include transfer ownership of the NFT to the first user.

In some embodiments, an image stored remotely or on a user's device is referenced to generate merchandise, such as a t-shirt, mug, photo reprint, photo book, Yearbooker, a hat and a calendar, and to place a chosen image content in a position upon a merchandise item via simple drag and drop of an image across a user interface to a selected Merchandise Item. In some embodiments, a user identification will additionally authenticate the user's rights to generate merchandise including a selected image.

A system of one or more computers can be configured to perform particular operations or actions by virtue of having software, firmware, hardware, or a combination of them installed on the system that in operation causes the system to perform specific actions, such as receive sensor input, execute method steps based upon the sensor input. One or more computer programs can be configured to perform particular operations or actions by virtue of including instructions that, when executed by data processing apparatus, cause the apparatus to perform the actions.

BRIEF DESCRIPTION OF THE DRAWINGS

The accompanying drawings are incorporated in and constitute a part of this specification, illustrate several embodiments of the disclosure, and together with the description, serve to explain the principles of the disclosure.

DETAILED DESCRIPTION

The present disclosure provides generally for an apparatus and method for ordering image-based articles of physical Merchandise in a physical world and corresponding virtual articles of merchandise associated with non-fungible tokens (NFTs).

In the following sections, detailed descriptions of examples and methods of the disclosure will be given. the description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Glossary

"Blockchain" as used herein refers to a shared, immutable ledger that is capable of recording transactions and/or tracking assets in a distributed network. An asset can may be a physical world, tangible article or intangible item, including an item in a virtual world and/or an NFT.

"Device," as used herein, refers to any smart device (comprising a controller and a storage) or computer, having a processor, memory, and network access device. Device includes, but is not limited to, smart phones, cellular phones, desktop computers, laptop computers, and tablet computers.

"Non-Fungible Token" ("NFT") to some embodiments, of the present invention an NFT is a one-of-a-kind digital token created (or "minted") and recorded on a digital ledger, called a blockchain. NFTs can be bought and sold like any other property, but they have no physical form. NFTs are "non-fungible" (i.e., unique and not interchangeable) because each token comprises unique data (e.g., code and other metadata) that distinguishes it from other NFTs relating to the relevant blockchain. Blockchain solutions like the public Ethereum network, Polkadot, Cosmos and Flow can be used to create NFTs. The NFTs can then be bought and sold via an NFT marketplace website that is linked to the underlying blockchain solution (e.g., OpenSea). According to the present invention the buying and selling of a NFT 367 may be tied to the sale of a corresponding physical item 310. Furthermore, in some embodiments, the NFT may exist in a virtual world, such as a metaverse.

"Merchandise," as used herein, refers to one or more of any number of potentially desirable items that a user may want to generate from an image. Merchandise includes, but is not limited to, hats, t-shirts, coffee mugs, calendars, photo books, and wall art.

"Public Ledger" as used herein refers to as a record-keeping system that maintains participants' identities in secure and (pseudo-)anonymous form, their respective NFT assets, and a record book of all the genuine transactions executed between network participants.

Figure 1A:
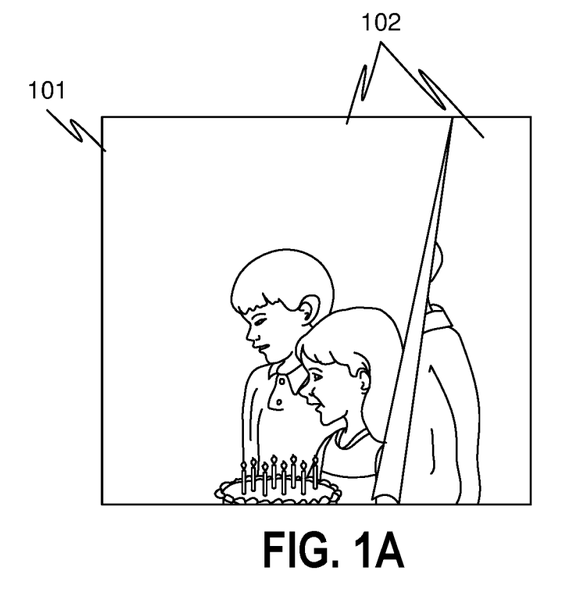
FIGS. 1A-1B illustrate examples of user interfaces that may be used in some embodiments of the present invention.

Referring now to FIG. 1A, an image display application 101 appears on the user's Device. The image display application 101 allows a user to view one or more images 102. In some embodiments, the one or more images will include a memory or photo book memorializing an event. Events may include a life event, such as a birthday, anniversary, wedding, christening, photo session, bar mitzvah or bat mitzvah. Other embodiments include a collection of images included in a school yearbook. This disclosure incorporates by reference U.S. Pat. No. 9,030,496 for disclosure describing a source of image data.

Figure 1B:
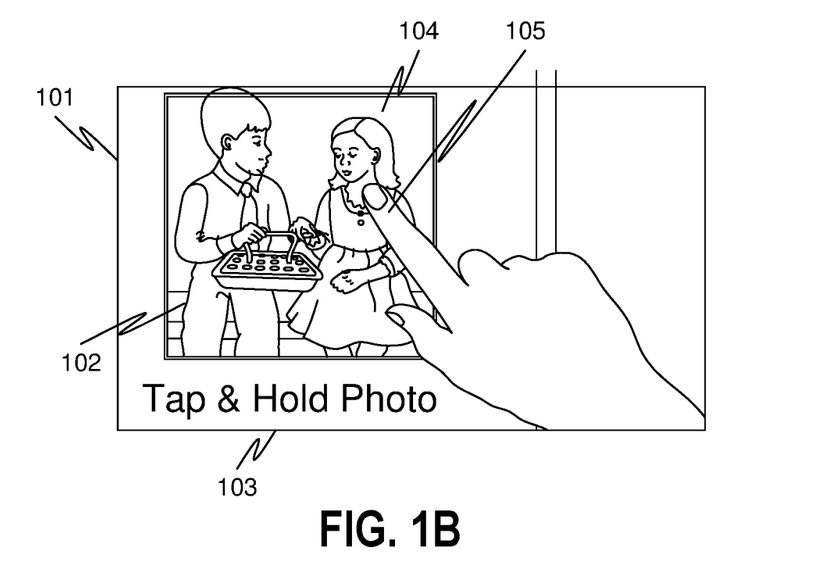

Referring now to FIG. 1B, when an image 102 appears on the image display application 101, the image display application 101 may cause instructions 103 for selecting a particular image to appear on the Device's display. In a preferred embodiment, this instruction 103 comprises the phrase "Tap & Hold photo." In this preferred embodiment, the Device also comprises a capacitive screen 104 that displays the image 102 may be responsive to a user action, such as a user providing a source of body heat (i.e. the user's finger) 105, thus allowing the user to carry out instruction 103 to select the particular image. In an alternative embodiment, the instructions 103 prompt the user to use a computer mouse to click the particular image 102. The image 102 may be associated with spatial coordinates, such as Cartesian Coordinates or Polar Coordinates.

Figure 2A:
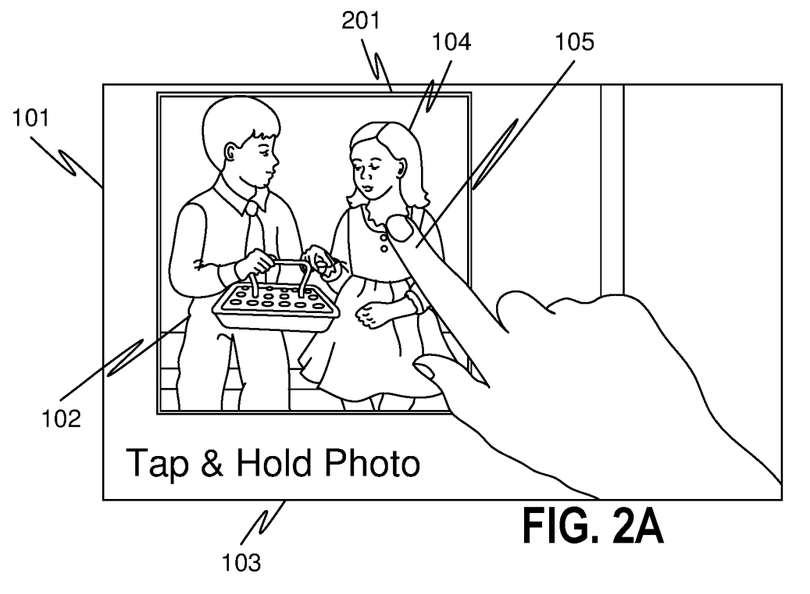
FIGS. 2A-2B illustrate examples of additional user interfaces that may be used in some embodiments of the present invention.

Referring now to FIG. 2A, once the user indicates a selection of an image 102 by following instruction 103, the image display application 101 applies a visual indication of selection 201 to the selected image 102 or a portion of selected image 102 by, for example, at least one of: surrounding the image 102 or portion of image 102 with a colored border; causing the image 102 or portion of image 102 to wiggle; causing image 102 or portion of image 102 to be highlighted or glow; and the like.

Figure 2B:
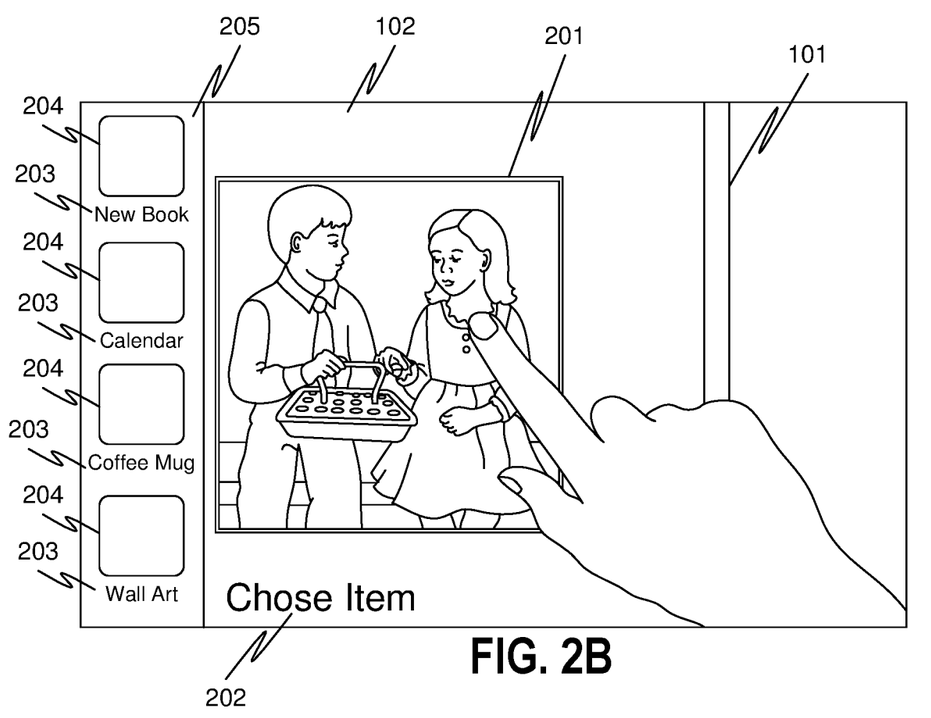

Referring now to FIG. 2B, once the image 102 is selected 201, the image display application 101 opens a side menu 205. Side menu 205 comprises one or more Merchandise options 203, and off-shade, picture frame-shaped boxes 204. The image display application 101 displays instructions 202 to instruct the user on how to choose the desired Merchandise.

Figure 3A:
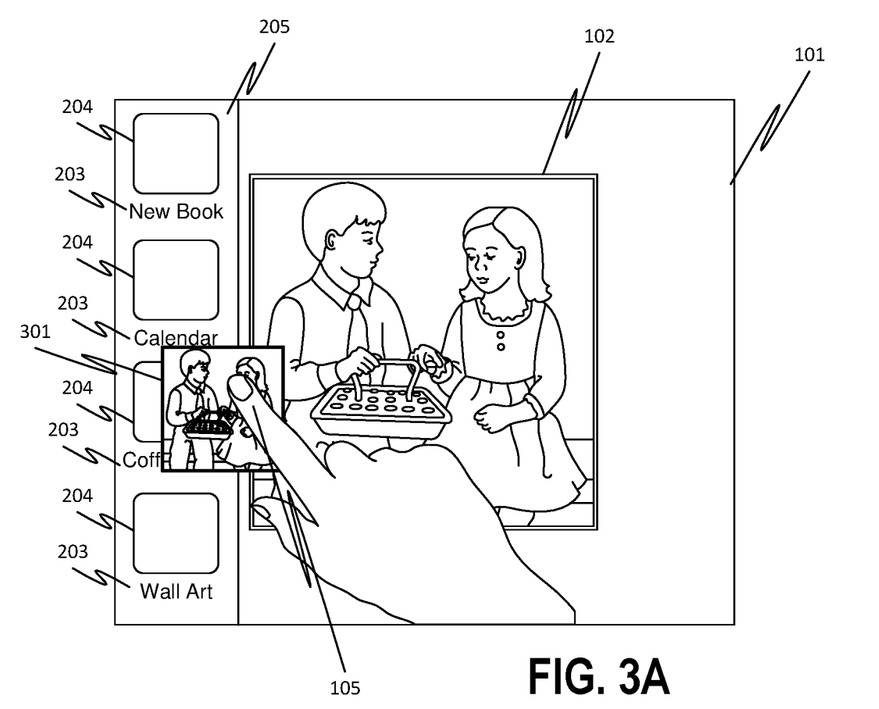
FIGS. 3A-3B illustrate examples of additional user interfaces that may be used in some embodiments of the present invention.

Referring now to FIG. 3A, a user can select the particular desired article of Merchandise by dragging and dropping the chosen image 102 using a user input device, such as a computer mouse or the user's finger 105, to the picture frame-shaped box 204 corresponding to the user's chosen article of Merchandise. FIG. 3A demonstrates the user creating a coffee mug from image 102. In some embodiments, as the user moves the selected image 102, it is automatically resized to fit the picture frame-shaped box 204. The resized image of the picture may be displayed on the article of merchandise such that the user may view a representation of an item to be generated with the image of the picture 301.

Figure 3B:
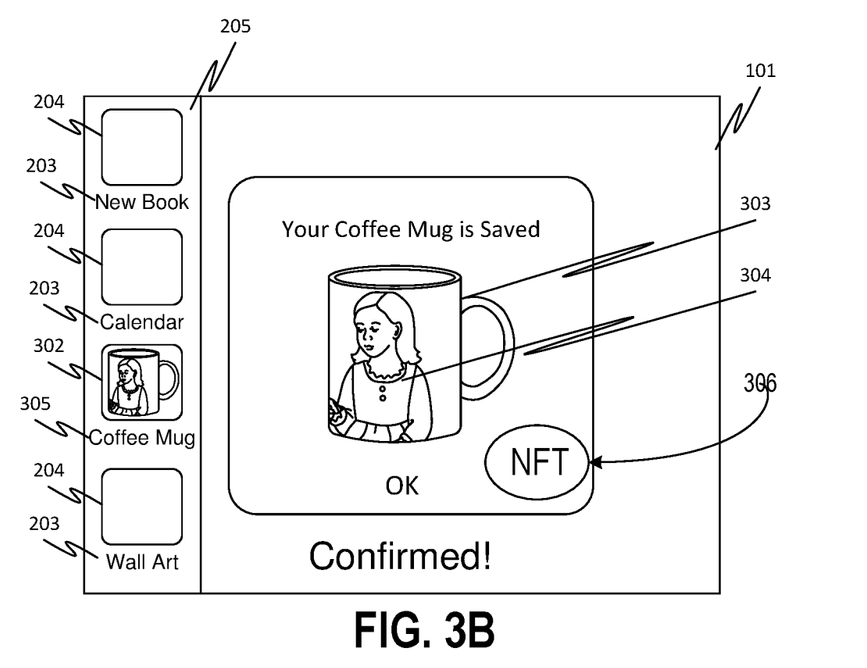

Referring now to FIG. 3B, in some embodiments, following the user selection of a particular desired article of Merchandise, the image display application 101 displays at least one preview 304 of the desired article of Merchandise, 305, as it would appear with the chosen image 302, 304. By way of non-limiting example, a preview 304 of a customized coffee mug may comprise the chosen image 102 wrapped around the generally cylindrical body of the coffee mug 303. In some embodiments, the image display application presents users with additional options for finalizing the Merchandise, such as, by way on non-limiting example, cropping the image, rotating the image, resizing the image or applying an annotation to the image.

In some embodiments, a set of Cartesian Coordinates may be associated with one or more segregated spatial areas on a Merchandise item. The segregated spatial areas may designate a position for a selected image to reside on a Merchandise item. The invention includes the provision of a user interface that allows a user to select an image, such as for example via a designation of an X,Y coordinate or other set of coordinates (e.g. Cartesian Coordinate or Polar Coordinate), and to additionally select a merchandise item via the use of coordinates, such as Cartesian or Polar coordinates designating a position within the user interface associated with the Merchandise item. Finally, a third set of coordinates, such as Cartesian Coordinates or Polar Coordinates, may be used to designate a position to generate a copy of the selected upon the Merchandise item.

Figure 4:
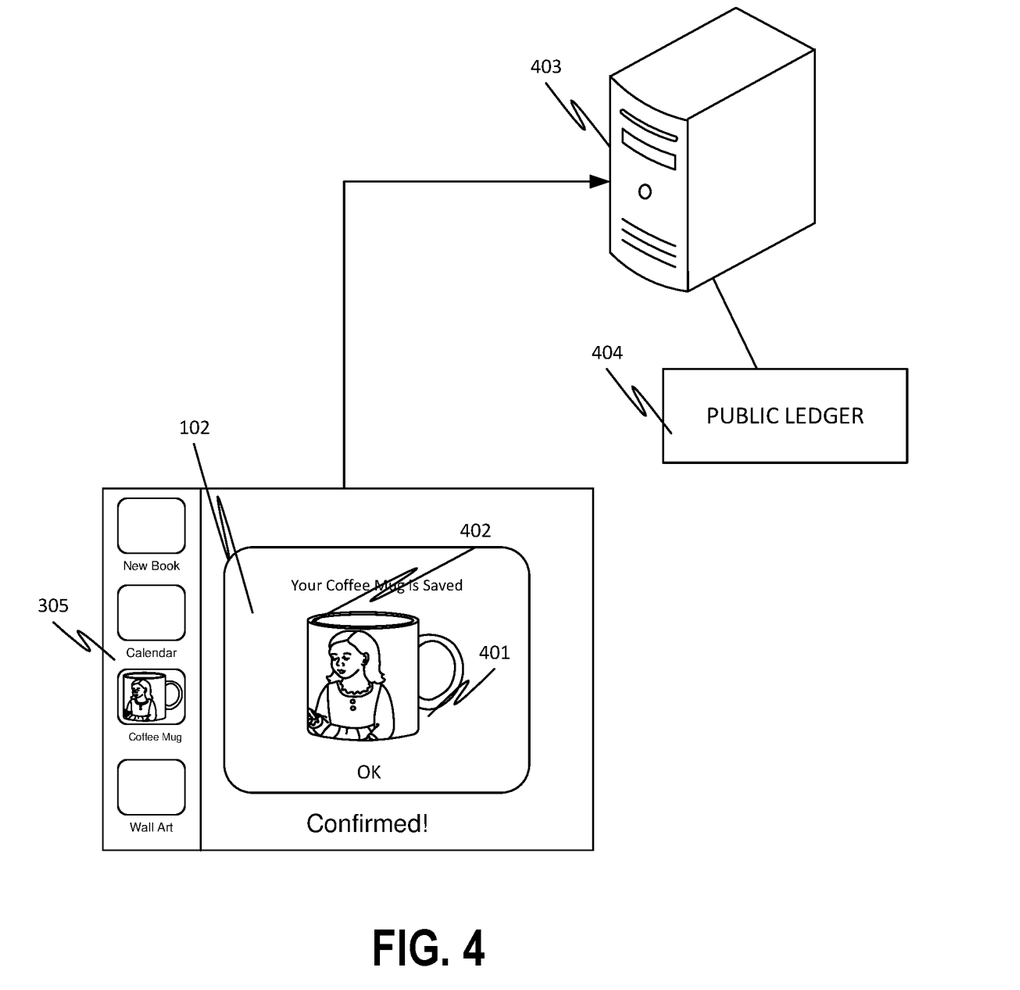
FIG. 4 illustrates a block diagram of apparatus and user interface that may be generated by the apparatus according to some embodiments of the present invention.

Referring now to FIG. 4, the user's Device 401 transmits through its network access device by wireless network, LTE cellular data connection, internet protocol, or other data transfer protocol, the user's order 402 to a remote server 403, for processing and creation of the actual Merchandise. The user's order comprises one or more images 102 and a chosen article of Merchandise 305, and may in some embodiments also comprise any alterations to the one or more images 102 provided by the user. In some embodiments, the photo may be exported to Merchandise site with the ability to include image 102 in an article of Merchandise. In some embodiments, image 102 may be transmitted to a photographer. In some embodiments, a photographer may capture image 102 and receive a royalty from any article of Merchandise sold based on image 102. In some embodiments, use fees may be applicable for reproduction. Device 401 may be in logical connection with an appropriate digital rights management apparatus to give or receive appropriate rights permissions in image 102.

In some embodiments, the user will have access only to images 102 for which the user has permission to generate Merchandise. In other embodiments, the user will have access to a larger set of images, and the user's permission to use a given image in generating Merchandise will be checked after the user has selected the image. For a collection of images, such as a memory book or yearbook, a user may receive a third party authorization (such as from an event organizer or a school representative). The third party authorization is additionally transmitted to a manufacturer thereby authorizing the generation of the customized article of merchandise.

A public ledger may be maintained by the server and securely store details of the transactions and processes described herein. The public ledger will preferably be a block based record-keeping system that maintains transaction details and other details, such as participants' identities. The identities may be stored in semi-anonymous form, respective NFT assets (such as physical and/or virtual articles of merchandise), and a record book of all the transactions executed between network participants.

Figure 5:
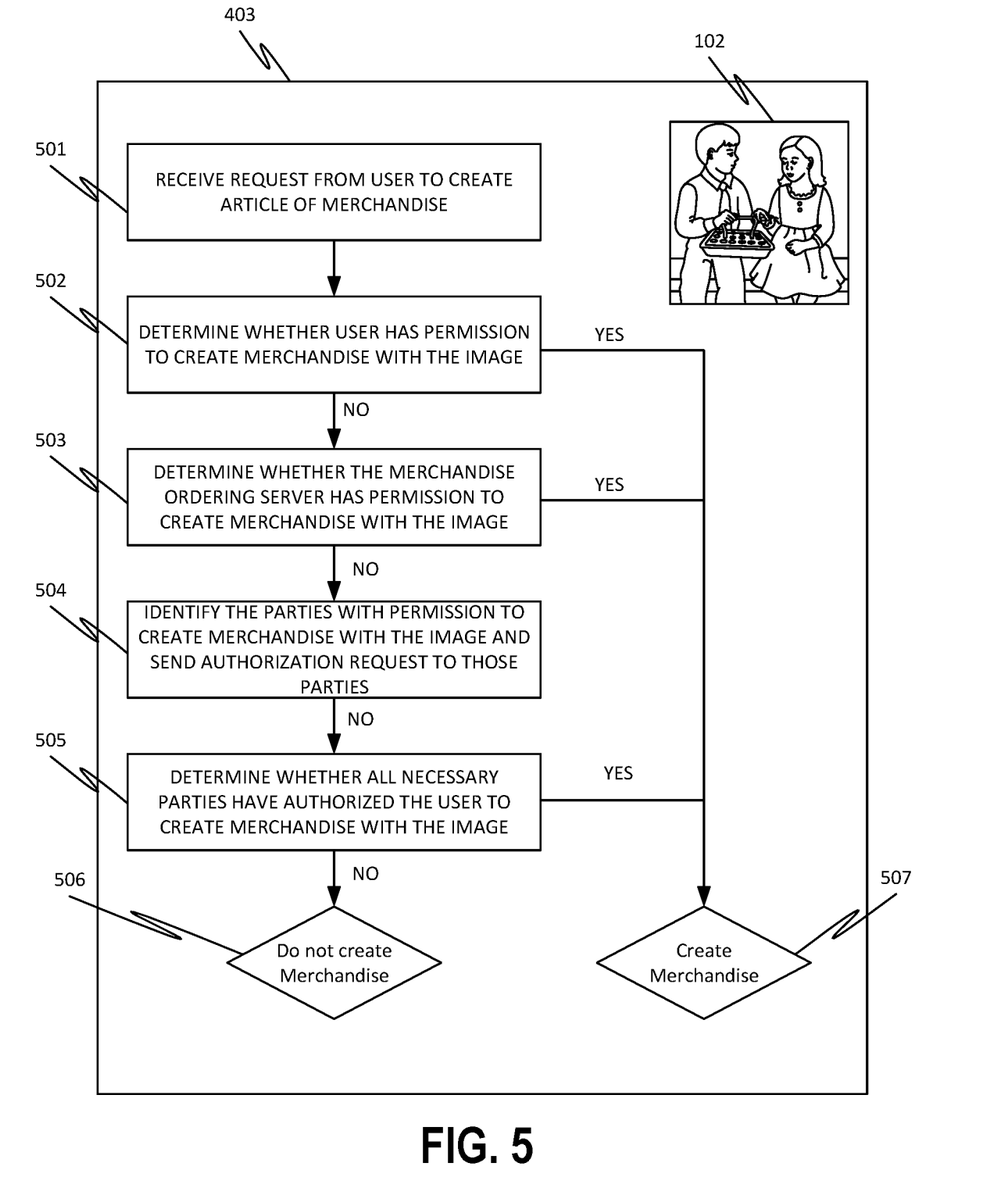
FIG. 5 illustrates an exemplary embodiment of a method for authenticating the rights of the user requesting Merchandise.

Accordingly, referring now to FIG. 5, there may be numerous methods relating to the verification of permission to use certain images. These methods may share some or all of a select set of common steps. In FIG. 5, these common steps may be depicted. The server 403 will receive 501 the desired at least one image 102.

The server 403 can then determine 502 whether the user has permission to create Merchandise with the at least one image 102. There may be many methods for verifying that the user has permission to create Merchandise with the at least one image 102. These methods may include metadata verification that the image is a picture taken with a camera corresponding to the user's Device; use of facial recognition software to match the subject of the at least one image 102 with on-file photographs of the user; or an affirmation by the user that he has the right to generate Merchandise with the at least one image 102. If it is verified that the user has permission to create Merchandise with the at least one image 102, then the order will be processed 507.

If the server cannot determine 502 that the user has permission to create Merchandise with the at least one image 102, then the server may verify 503 that the owner of the server has permission to create Merchandise with the at least one image 102. For example, image hosting service Instagram requires that its users grant Instagram a royalty-free license to use in connection with advertising any content the users upload to Instagram. See Terms of Use, INSTAGRAM, http://help.instagram.com/478745558852511 (last updated Jan. 19, 2013). If the server owner has a similar license with respect to the at least one image 102, then the order will be processed 507.

If neither the user nor the server owner has permission to create Merchandise with the at least one image 102, then the server will 504 identify the other party whose permission is needed to use the at least one image 102. The other party may be at least one of: the photographer of the at least one image 102, a person depicted in the at least one image 102, or the parent of the person depicted in the at least image 102 if the person is a minor. There may be numerous methods to identify the other party whose permission is needed, including, but not limited to, facial recognition software or use of user- or computer-inputted metatags on the at least one image 102 itself.

The server will then seek authorization 505 from the other party to create Merchandise with the at least one image 102. There may be numerous methods to seek authorization from the other party, including, but not limited to, automatically generating an email, or if the other party also has the image display software 101 on a Device owned by her, transmitting a signal to the image display software 101 on the other party's Device that prompts the other party to give or decline authorization. If the other party grants authorization to create Merchandise with the at least one image 102, then the order will be processed 507. If the other party does not grant authorization, then the order will be deleted 506, and the server 403 will transmit a cancellation message to the user's Device. Server 403 may also be operative to assemble a photobook based on the at least one image 102 to send to third parties. The third parties may also create their own Merchandise based on the at least one image 102. In some embodiments, the third parties may receive compensation for sales for such Merchandise.

Figure 6:
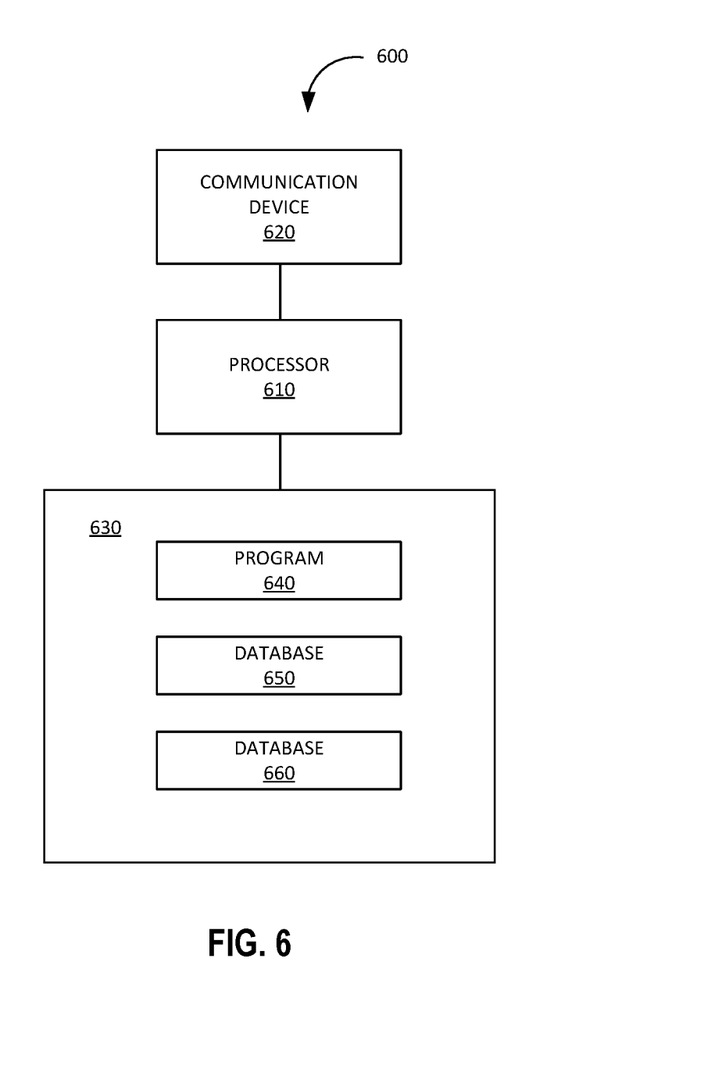
FIG. 6 illustrates an exemplary embodiment of an apparatus that may be used to implement some aspects of the present disclosure including executable software.

In addition, FIG. 6 illustrates a controller 600 that may be utilized to implement some embodiments of the present invention. The controller may be included in one or more of the apparatus described above, such as the Revolver Server, and the Network Access Device. The controller 600 comprises a processor unit 610, such as one or more semiconductor based processors, coupled to a communication device 620 configured to communicate via a communication network (not shown in FIG. 6). The communication device 620 may be used to communicate, for example, with one or more online devices, such as a personal computer, laptop, or a handheld device.

The processor 610 is also in communication with a storage device 630. The storage device 630 may comprise any appropriate information storage device, including combinations of storage devices (e.g., cloud storage, mechanical disk drives, solid state disk drives), and/or semiconductor memory devices such as Random Access Memory (RAM) devices and Read Only Memory (ROM) devices.

The storage device 630 can store a software program 640 for controlling the processor 610. The processor 610 performs instructions of the software program 640, and thereby operates in accordance with the present invention. The processor 610 may also cause the communication device 620 to transmit information, including, in some instances, control commands to operate apparatus to implement the processes described above. The storage device 630 can additionally store related data in a database 650 and database 660, as needed. The data may include GPS, timestamp, resolution, general EXIF metadata, IPTC metadata, etc.

Figure 7:
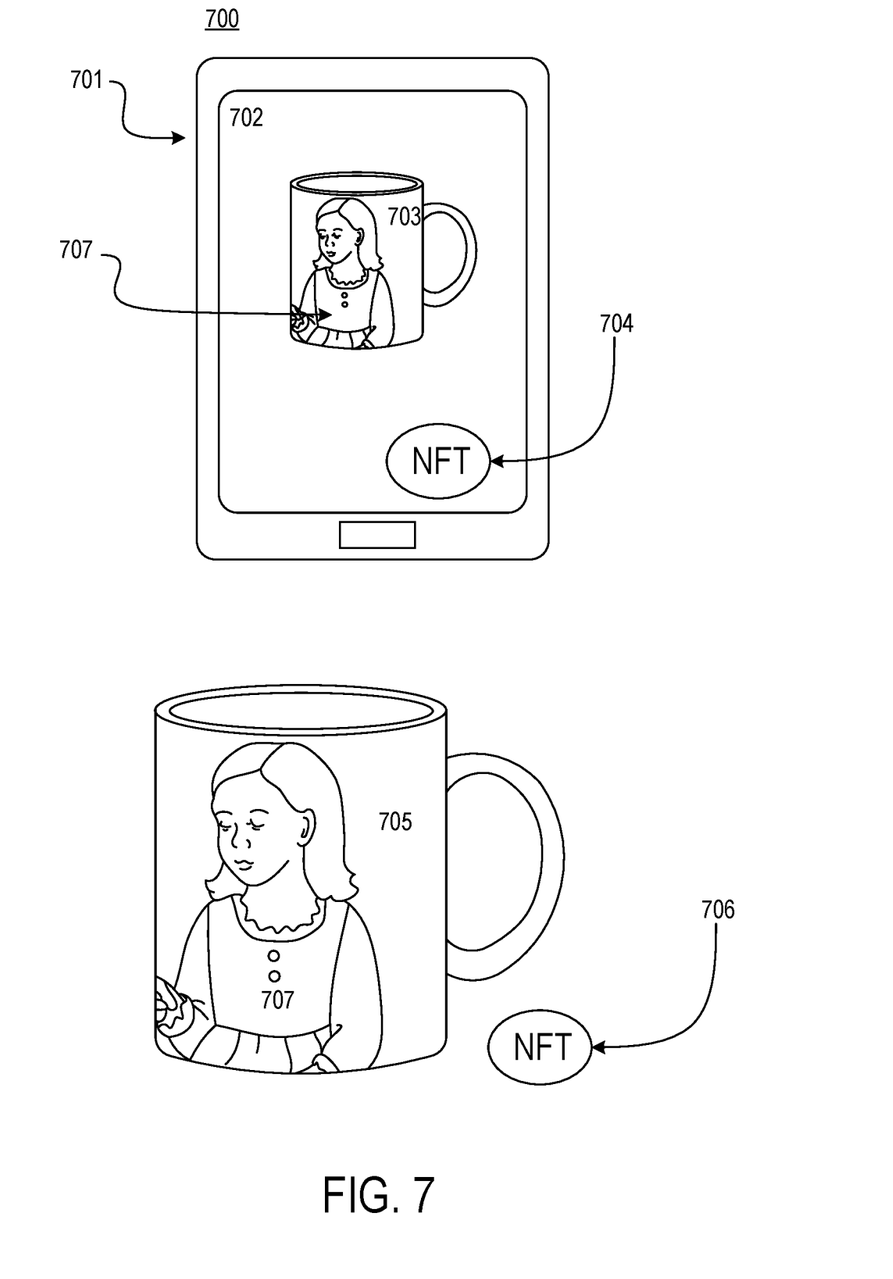
FIG. 7 illustrates a schematic diagram of aspects of the present invention.

Referring now to FIG. 7, a schematic diagram illustrates a physical article of merchandise 705 (as illustrated a mug) with a designated photo 707 and an associated NFT 706. The associated NFT may convey rights in one or both of the photo 707 and the physical article of merchandise 705.

A corresponding virtual article of merchandise 703 may be created in a virtual world and displayed on a user interface 702 on a computing device 701. A second NFT 704 may be associated with the virtual article of merchandise 703.

According to the present invention, a physical article of merchandise 705 may be created with input from a user specifying one or more photos (such as a first photo and a second photo) and a physical placement of the one or more photos on the physical article 705. A virtual article of merchandise 703 corresponds with the physical article of merchandise 705. One or more of an NFT 706 associated with the physical article of merchandise 705 and an NFT associated with the virtual article of merchandise 704. A public ledger 404 may be maintained on one or more servers that records transfers of ownership and other details related to one or more of the physical article of merchandise 705, the virtual article of merchandise 703, and the photo 707.

The public ledger may include a record-keeping system (apparatus with executable software software) that is operable to maintain participants' identities in secure and (pseudo-) anonymous form, their respective NFT assets, and a record book of all the genuine transactions executed between network participants.

Figure 8:
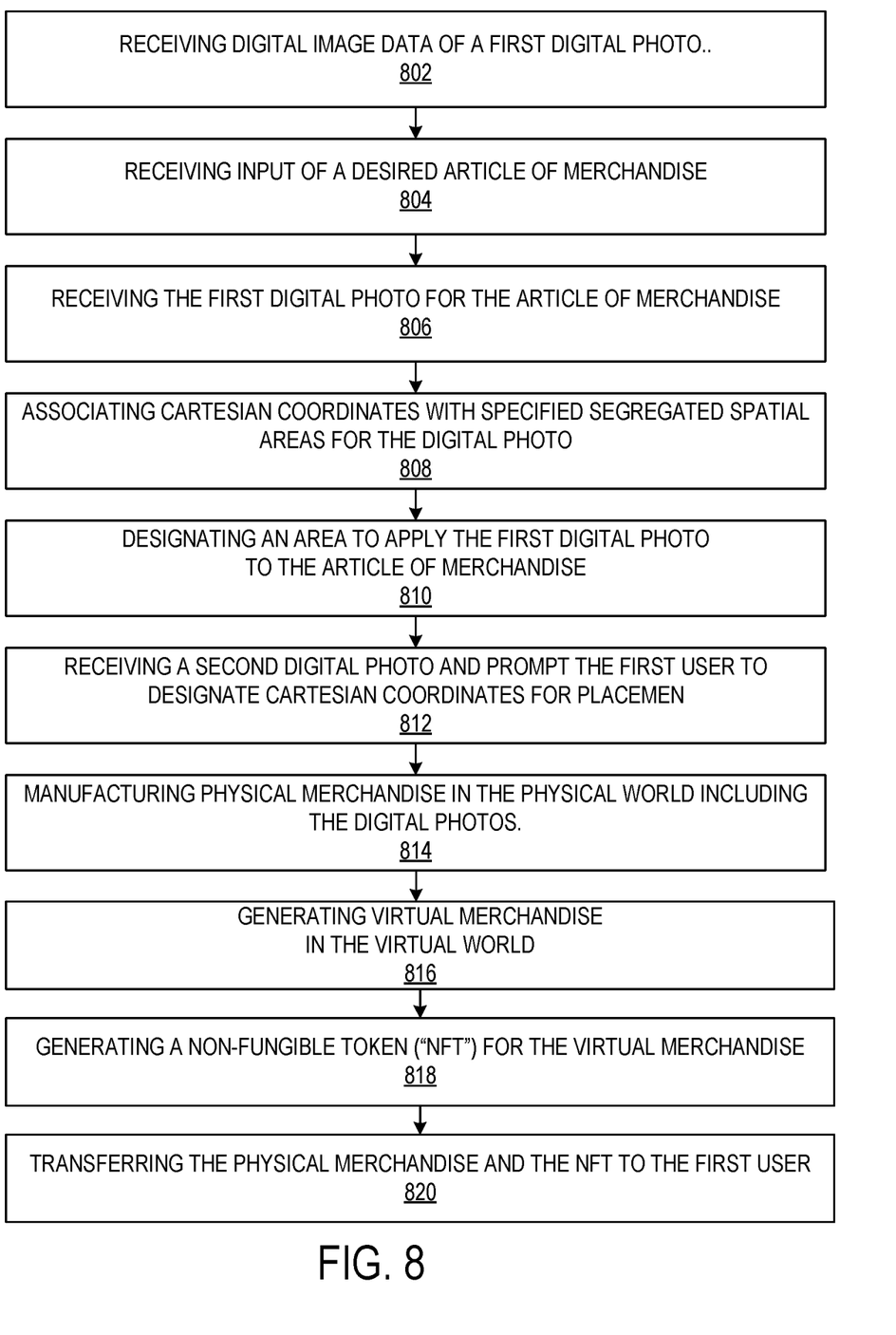
FIG. 8 illustrates a flow chart with method steps that may be executed according to some variants of the present invention.

Referring now to FIG. 8 a flowchart is illustrated that shows a method for generating a physical article of merchandise in the virtual world and virtual article of merchandise in a virtual world, according to some embodiments of the present disclosure. At step 802, the method may include receiving digital image data from a image capture device, the digital image data representative of a first digital photo. At step 804, the method may include receiving from a first user an input choosing a desired article of merchandise. At step 806, the method may include receiving the first digital photo to be applied to the article of merchandise. At step 808, the method may include associating Cartesian Coordinates with one or specified spatial areas of the first digital photo received from the image capture device.

At step 810, the method may include designating an area to apply the first digital photo to the article of merchandise. At step 812, the method may include receiving a second digital photo and prompt the first user to designate desired Cartesian Coordinates on the article of merchandise. In some embodiments, to apply the first digital photo and the second digital photo. At step 814, the method may include manufacturing the article of merchandise in the physical world ("physical merchandise"), the physical merchandise comprising a replication of the first digital photo and the second digital photo.

At step 816, the method may include generating a virtual article of merchandise in a virtual world ("virtual merchandise"), the virtual merchandise comprising a virtual replication of the first digital photo and the second digital photo. At step 818, the method may also include generating a non-fungible token ("NFT") for the virtual merchandise. At 820, the method may include transferring one or both of the physical merchandise to the first user and transferring ownership of the NFT to the first user.

In some embodiments, the method may additionally include the step of recording a transfer of one or both of: the article of merchandise in the physical world, and the NFT in a public ledger. In some preferred embodiments, the public ledger may be a blockchain ledger.

According to some embodiments, a public ledger that records ownership of one or both of: the physical merchandise, and an associated NFT may include data management and storage system such as, for example, a cloud based database system. Preferred embodiments include a blockchain based public ledger, which may include a series (or chain) of blocks on which transaction details are recorded after suitable authentication and verification by network participants.

A recording and storage of confirmed transactions on such public ledgers at the start of a related series of transactions, such as all photos in a particular collection (e.g., all photos of students from a particular school). If a block is pending a state of capacity with transaction details, one or more new blocks may be mined and added to the blockchain by a designated network participant (e.g., a miner). Some network participants may receive and store a full copy of an entire ledger on a specified device that is connected to an associated trading network. The public ledger may be distributed in a manner conducive to participants connecting and contributing to blockchain network activities in order for it to maintain its functionality.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A method for generating a physical article of merchandise in a physical world and a virtual article of merchandise in a virtual world, the method comprising:
   receiving digital image data from an image capture device, said digital image data representative of a first digital photo;
   receiving from a first user an input indicating a type of the physical article of merchandise that is desired;
   receiving the first digital photo to be applied to the physical article of merchandise or the virtual article of merchandise;
   associating a first set of Cartesian Coordinates with specified segregated spatial areas of the first digital photo received from the image capture device;
   designating an area to apply the first digital photo to the physical article of merchandise or to the virtual article of merchandise;
   receiving a second digital photo and prompt the first user to designate a second set of Cartesian Coordinates on the physical article of merchandise or the virtual article of merchandise in which to apply the first digital photo and the second digital photo;
   manufacturing the physical article of merchandise in the physical world ("physical merchandise"), the physical merchandise comprising a physical replication of the first digital photo and the second digital photo;
   generating the virtual article of merchandise in the virtual world ("virtual merchandise"), the virtual merchandise comprising a virtual replication of the first digital photo and the second digital photo;
   generating a first non-fungible token ("NFT") for the physical merchandise;
   generating a second NFT for the virtual merchandise;
   transferring the physical merchandise to the first user; and
   transferring ownership of the second NFT to the first user.

2. The method of claim 1 additionally comprising the step of recording the transfer of the physical article of merchandise in the physical world in a public ledger.

3. The method of claim 2 additionally comprising the step of recording the transferring of ownership of the first NFT and the second NFT related to respectively the physical merchandise and the virtual merchandise in the public ledger.

4. The method of claim 3, wherein the public ledger is a blockchain ledger.

5. The method of claim 1, wherein the physical merchandise comprises a t-shirt.

6. The method of claim 1, wherein the physical merchandise comprises a mug.

7. The method of claim 1, further comprising:
determining whether the first user has permission to create the physical merchandise that includes the first digital photo;
upon determining that the first user is without the permission to create the physical merchandise that includes the first digital photo, determining whether an ordering server of the physical merchandise has the permission to create the physical merchandise that includes the first digital photo;
upon determining that the first user and the ordering server of the physical merchandise are without the permission to create the physical merchandise that includes the first digital photo, identifying another party whose permission is required to use the first digital photo, and sending an authorization request to the other party; and
upon determining that the first user is without authorization of the other party to create the physical merchandise that includes the first digital photo, and that the first user and the ordering server of the physical merchandise are without the permission to create the physical merchandise that includes the first digital photo, precluding the first user from creating the physical merchandise.

8. The method of claim 1, further comprising:
designating a third set of Cartesian Coordinates associated with a position to generate a copy of the physical article of merchandise that is desired.

9. An apparatus for generating a physical article of merchandise in a physical world and a virtual article of merchandise in a virtual world, the apparatus comprising:
a computer server having a processor for post processing digital image data, said computer server in logical communication with an image capture device and accessible with a network access device via a digital communications network;
executable software stored on the computer server and executable on demand, the software operative with the processor to cause the apparatus to:
receive the digital image data from the image capture device, said digital image data representative of a first digital photo;
receive from a first user an input indicating a type of the physical article of merchandise that is desired;
receive the first digital photo to be applied to the physical article of merchandise of the virtual article of merchandise;
associate a first set of Cartesian Coordinates with specified segregated spatial areas of the first digital photo received from the image capture device;
designate an area to apply the first digital photo to the physical article of merchandise or to the virtual article of merchandise;
receive a second digital photo and prompt the first user to designate a second set of Cartesian Coordinates on the physical article of merchandise or the virtual article of merchandise in which to apply the first digital photo and the second digital photo;
manufacture the physical article of merchandise in the physical world ("physical merchandise"), the physical merchandise comprising a physical replication of the first digital photo and the second digital photo;
generate the virtual article of merchandise in the virtual world ("virtual merchandise"), the virtual merchandise comprising a virtual replication of the first digital photo and the second digital photo;
generate a first non-fungible token ("NFT") for the physical merchandise;
generate a second NFT for the virtual merchandise;
transfer the physical merchandise to the first user; and
transfer ownership of the second NFT to the first user.

10. The apparatus of claim 9, wherein the second digital photo is owned by a third party including a server owner and the executable software stored on the computer server and executable on demand is additionally software operative to cause the apparatus to transmit permission in the physical world and the virtual world to use a likeness of the second digital photo.

11. The apparatus of claim 9, wherein the executable software stored on the computer server and executable on demand is additionally operative with the computer server to cause the apparatus to transmit a notification to the first user that the physical article of merchandise has been manufactured in the physical world and the first NFT or the second NFT have been generated in the virtual world.

12. The apparatus of claim 11, wherein the executable software stored on the computer server and executable on demand is additionally operative with the computer server to receive from the first user an input comprising text to apply to the physical merchandise, the virtual merchandise, and the first NFT or the second NFT.

13. The apparatus of claim 12, wherein the executable software stored on the computer server and executable on demand is additionally operative with the computer server to receive from the first user a designation of Cartesian Coordinates for placement of the first digital photo, the second digital photo and the text, on the physical merchandise and the virtual merchandise.

14. The apparatus of claim 9, wherein the physical merchandise comprises a t-shirt.

15. The apparatus of claim 9, wherein the physical merchandise comprises a mug.

16. The apparatus of claim 9, wherein the executable software stored on the computer server and executable on demand is additionally operative with the computer server to transmit to a third party via the digital communications network a replication of one or more of: the first digital photo, the second digital photo, the virtual merchandise and the first NFT or the second NFT.

17. The apparatus of claim 9, wherein the executable software stored on the computer server and executable on demand is additionally operative with the computer server to transmit to a device associated with the first user a visual indication corresponding to a selection of the first digital photo, wherein the visual indication comprises at least one of: highlighting the first digital photo; causing the first digital photo to virtually wiggle; or surrounding the first digital photo with a colored frame.

18. The apparatus of claim 9, wherein the executable software stored on the computer server and executable on demand is additionally operative with the computer server to manufacture a photo book comprising static representations of the first digital photo and the second digital photo.

19. The apparatus of claim 9, wherein the first NFT is generated for conveying rights to the first digital photo.

20. The apparatus of claim 19, wherein the second NFT and the virtual merchandise are displayed on a user interface, and the processor is configured to record the transfer of ownership of the first NFT related to the first digital photo and the physical merchandise, and of the second NFT related to the virtual merchandise in a public ledger comprising a blockchain ledger.

* * * * *